United States Patent
Baumann et al.

(10) Patent No.: US 10,102,724 B2
(45) Date of Patent: Oct. 16, 2018

(54) OPERATING DEVICE FOR OPERATING AN ELECTRICAL BICYCLE COMPONENT

(71) Applicant: SRAM Deutschland GmbH, Schweinfurt (DE)

(72) Inventors: Sven Baumann, Grettstadt (DE); Jochen Bierwerth, Arnstein (DE); Wolfram Frank, Bamberg (DE); Chris Hilton, Wonfurt (DE)

(73) Assignee: SRAM DEUTSCHLAND, GMBH, Schweinfurt (DE)

( * ) Notice: Subject to any disclaimer, the term of this patent is extended or adjusted under 35 U.S.C. 154(b) by 0 days.

(21) Appl. No.: 15/486,825

(22) Filed: Apr. 13, 2017

(65) Prior Publication Data

US 2017/0301194 A1    Oct. 19, 2017

(30) Foreign Application Priority Data

Apr. 13, 2016 (DE) .......................... 10 2016 004 329

(51) Int. Cl.
| | |
|---|---|
| *B62J 3/00* | (2006.01) |
| *G08B 6/00* | (2006.01) |
| *B62K 23/06* | (2006.01) |
| *B62L 3/02* | (2006.01) |
| *B62M 25/08* | (2006.01) |

(52) U.S. Cl.
CPC ................ *G08B 6/00* (2013.01); *B62K 23/06* (2013.01); *B62L 3/02* (2013.01); *B62M 25/08* (2013.01)

(58) Field of Classification Search
CPC ...... B62M 25/00; B62M 25/02; B62M 25/04; B62M 25/08; B62M 9/122; B62K 23/00; B62K 23/06; Y10T 74/20438; G08B 6/00; B62L 3/02
USPC .............. 340/432; 74/473.12–473.15, 473.3, 74/473.35
See application file for complete search history.

(56) References Cited

U.S. PATENT DOCUMENTS

| | | | | |
|---|---|---|---|---|
| 6,991,081 | B2 * | 1/2006 | Uno ....................... | B62K 23/06 74/473.12 |
| 7,779,724 | B2 * | 8/2010 | Fujii ..................... | B62M 25/08 340/432 |
| 2009/0102628 | A1 * | 4/2009 | Takebayashi .......... | B62M 25/08 340/432 |
| 2014/0303859 | A1 * | 10/2014 | Miki ..................... | B62M 25/08 701/60 |
| 2015/0210354 | A1 * | 7/2015 | Kuroda .................. | B62M 25/08 474/70 |

* cited by examiner

*Primary Examiner* — Thomas Mullen

(57) ABSTRACT

An operating device for operating an electrical bicycle component includes an annular base element, annular actuating element and first electrical contact switch. The annular base element is configured to be non-rotatably mounted about a bicycle handlebar. The annular actuating element is rotatable relative to the annular base element from a neutral position to a first actuating position. The annular actuating element is pre-loaded into the neutral position. The first electrical contact switch is actuated when the annular actuating element is moved from the neutral position to the first actuating position to generate a first sensory feedback.

20 Claims, 8 Drawing Sheets

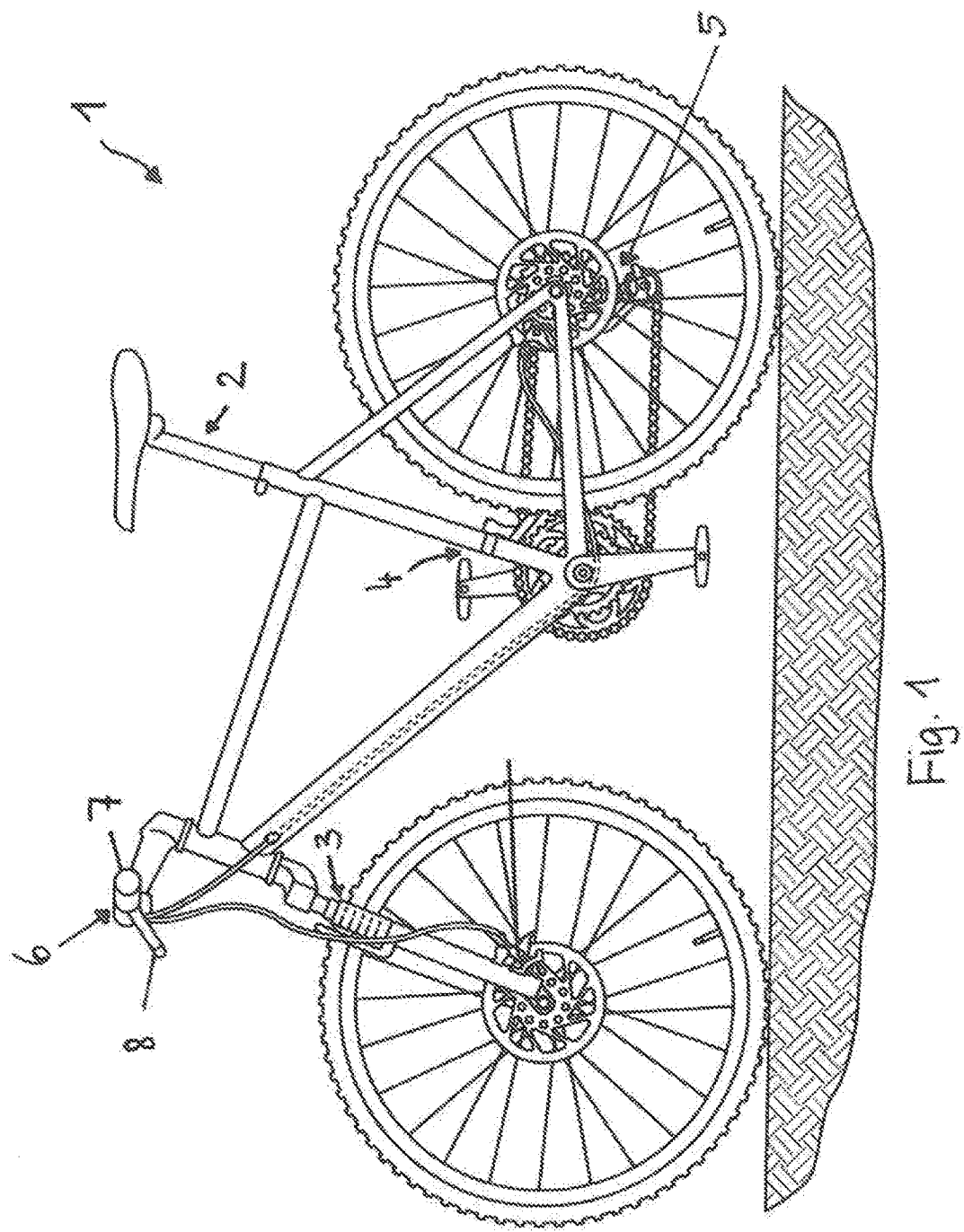

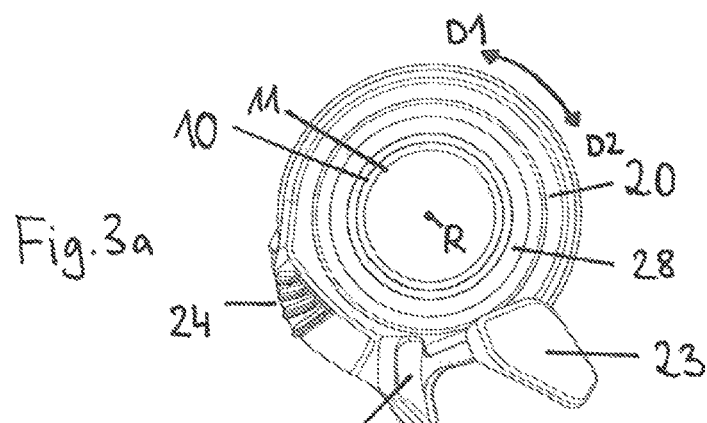
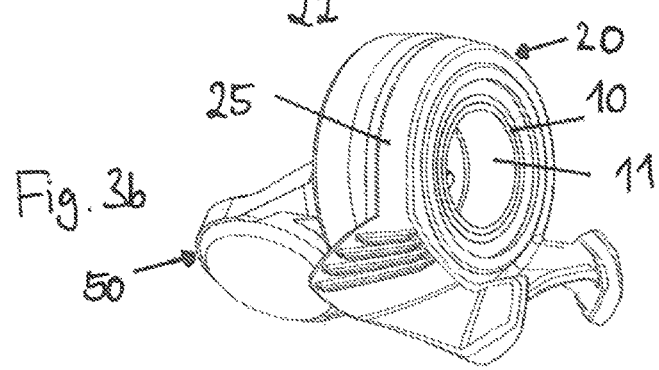
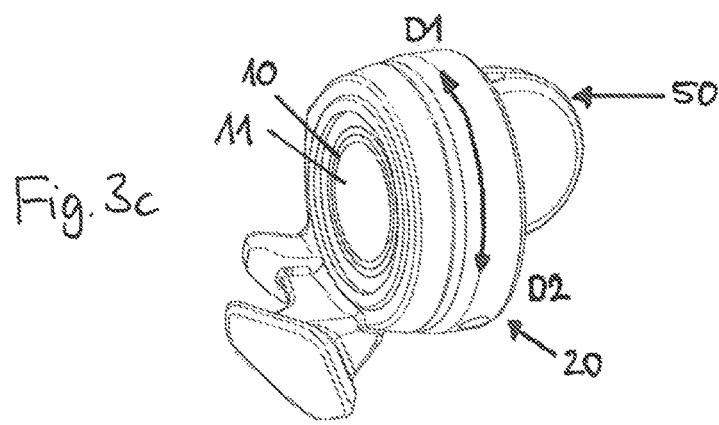
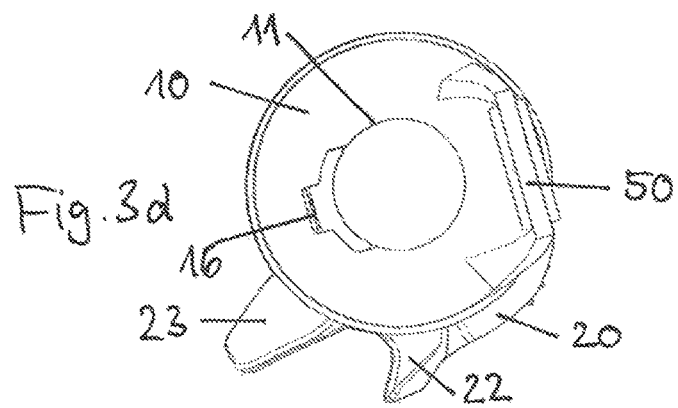

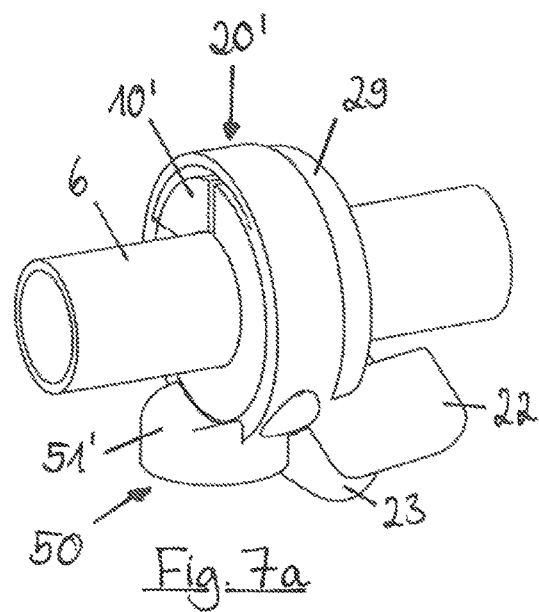
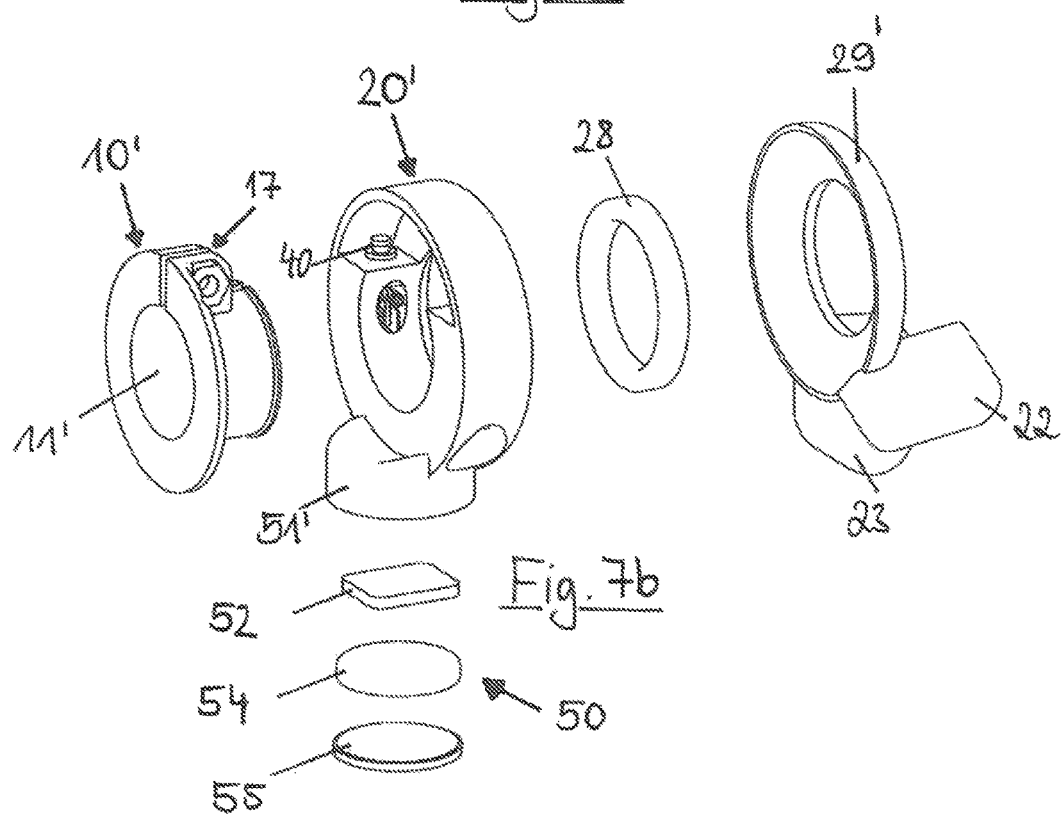

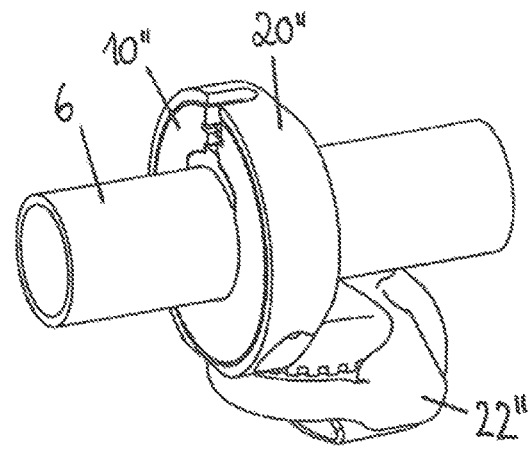
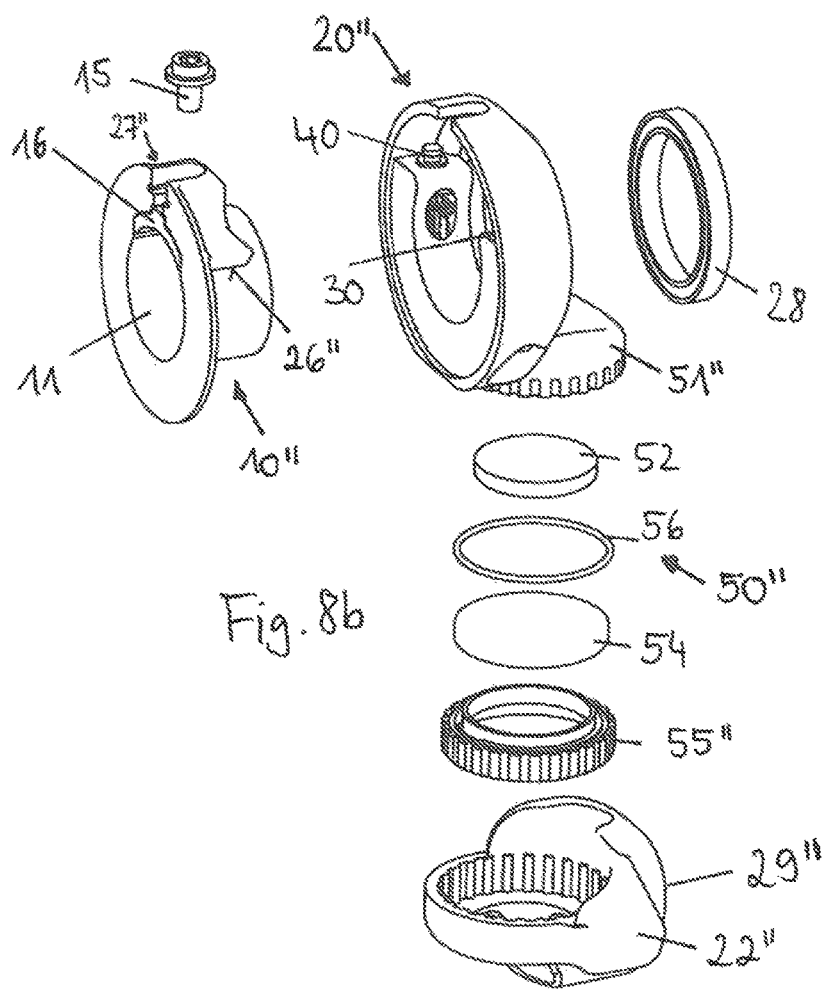

OPERATING DEVICE FOR OPERATING AN ELECTRICAL BICYCLE COMPONENT

This application claims priority to, and/or the benefit of, German patent application 10 2016 004 329.6, filed on Apr. 13, 2016, the contents of which are herein referenced in their entirety.

FIELD OF THE INVENTION

The invention relates to an operating device for operating an electrical bicycle component.

BACKGROUND

The use of electrical bicycle components, such as, for example, electrically controlled gear shifting mechanisms, is continuously increasing. The prior art describes different approaches for electrically shifting or operating bicycle components with the aid of electrical contact switches. The disadvantage of the known systems is their complex design.

There is a need for an operating device for operating an electrical bicycle component, which not only has a simple design, but also provides sufficient haptic feedback to the rider when said device is actuated.

SUMMARY

An embodiment provides an operating device for operating an electrical bicycle component. The operating device comprises an annular base element, an annular actuating element and a first electrical contact switch. The base element is configured to be non-rotatably mounted about a bicycle handlebar. The actuating element is rotatable relative to the base element from a neutral position to a first actuating position. The actuating element is pre-loaded into the neutral position. The first electrical contact switch is actuated when the actuating element is moved from the neutral position to the first actuating position. Upon actuation, the first electrical contact switch generates a sensory feedback and transfers the sensory feedback to the actuating element.

Another embodiment provides a control system for controlling an electrical bicycle component that comprises an operating device and a transmitter unit. The operating device comprises an annular base element, an annular actuating element and a first electrical contact switch. The annular base element is configured to be non-rotatably mounted about a bicycle handlebar. The annular actuating element is rotatable relative to the annular base element from a neutral position to a first actuating position. The annular actuating element is pre-loaded into the neutral position. The first electrical contact switch is actuated when the annular actuating element is moved from the neutral position to the first actuating position. The first electrical contact switch, upon actuation, generates a first sensory feedback and transfers the first sensory feedback to the annular actuating element. The transmitter unit is connected to the first electrical contact switch and configured to transmit a control signal to a receiver unit when the operating device is actuated.

BRIEF DESCRIPTION OF THE DRAWINGS

FIG. 1 shows a bicycle comprising and operating device for operating an electrical bicycle component;

FIG. 2b is a side view of FIG. 2a;

FIG. 3a shows a first embodiment of an operating device;

FIG. 3b is a rear perspective view of the operating device in FIG. 3a;

FIG. 3c is a front perspective view of the operating device in FIG. 3a;

FIG. 3d is a side view of the operating device in FIG. 3a;

FIG. 4b is a further exploded view of FIG. 4a;

FIG. 7a shows a second embodiment of an operating device;

FIG. 7b is an exploded view of the operating device in FIG. 7a;

FIG. 8a shows a third embodiment of an operating device; and

FIG. 8b is an exploded view of the operating device in FIG. 8a.

DETAILED DESCRIPTION OF THE DRAWINGS

Figure 2A:
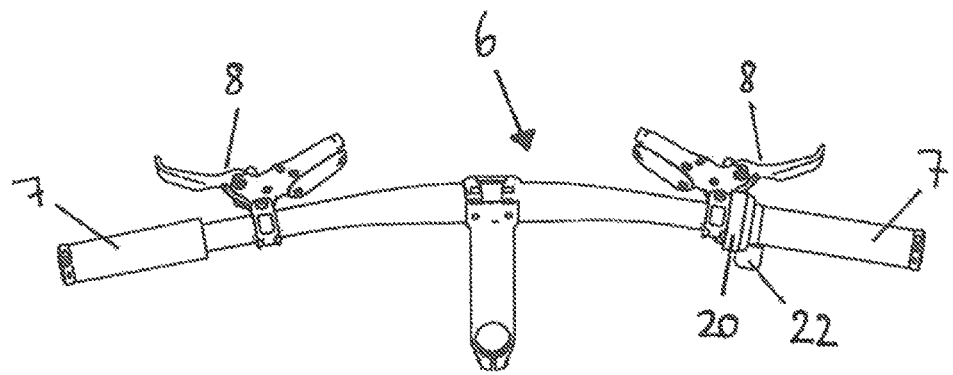
FIG. 2a shows bicycle handlebar comprising an operating device, installed thereon, for operating an electrical bicycle component.

"Operating" an electrical bicycle component means activating or operating any type of electrical bicycle component. "Electrical bicycle components" are considered to be electrical, electronic, electro-mechanical, electro-pneumatic, and electro-hydraulic bicycle components, such as front or rear gear shifting mechanisms or derailleurs, front-wheel suspension systems, rear-wheel suspension systems, or height-adjustable seat posts.

An embodiment provides an operating device for operating an electrical bicycle component. The operating device comprises an annular base element and an annular actuating element. The base element is non-rotatably mounted to or installed on bicycle handlebar. The base element encompasses or is mounted about the bicycle handlebar in the installed state. The actuating element is located on the base dement. The actuating element is rotatable relative to the base element. The actuating element is rotatable from a neutral position to a first actuating position. The actuating element is pre-loaded into the neutral position. The operating device further comprises a first electrical contact switch which is actuated when the actuating element is moved from the neutral position to the first actuating position. Upon actuation, the first electrical contact switch generates a sensory feedback and transfers the feedback to the actuating element.

The advantage of this embodiment is that the electrical contact switch itself generates the sensory feedback. Therefore, no further components or design measures are necessary. The complexity of the operating device and the amount of effort required to assemble the operating device are thereby substantially reduced. An operating device comprising only one electrical contact switch, which is actuated in only one actuating position, is particularly suitable for operating electrical bicycle components which can be brought only into a first state and a second state. The actuation of the electrical switch results in a change-over between these two states. A bicycle component is therefore initially in the first state and changes over into the second state upon actuation of the operating device. When the operating device is actuated again, the bicycle component changes back to the first state, and so on. With the aid of such an operating device, a front electrical derailleur for only two chainrings, for example, could shift the two chainrings in alternation or switch an electro-pneumatic suspension on and off.

If the base element is installed on the bicycle handlebar, the base element encompasses or is mounted about the handlebar, and therefore a longitudinal axis of the base element extends approximately coaxially to a handlebar axis of the bicycle handlebar. The actuating element is situated on the base element and is rotatable relative thereto. Upon actuation, the actuating element rotates about a rotational axis which extends coaxially to the longitudinal axis of the fixed base element.

According to one embodiment of the device for operating an electrical bicycle component, the actuating element is rotatable from the neutral position to a second actuating position. The actuating element is pre-leaded into the neutral position.

According to one embodiment, the operating device further comprises a second electrical contact switch. The second electrical contact switch is actuated when the actuating element is moved from the neutral position to the second actuating position. Upon actuation, the second electrical contact switch also generates a sensory feedback and transfers the feedback to the actuating element.

Two different actuating positions, in each of which an electrical contact switch is actuated, make it possible for the bicycle component to be brought into two different states by the operating device. For example, in the first actuating position, upon actuation of the first electrical contact switch, an electrical gear shifting mechanism can be triggered to shift into the next-higher gear and, in the second actuating position, upon actuation of the second electrical contact switch, the electrical gear shifting mechanism can be triggered to shift into the next-lower gear.

The first and the second actuating positions can he located next to one another in the same direction of rotation in this case. The rider would move the actuating element in a first direction of rotation in order to actuate the actuating element and would initially reach the first actuating position, in which the first electrical contact switch is actuated. If the actuating element is then rotated further in the first direction of rotation, past the first actuating position, the actuating element reaches the second actuating position, in which the second electrical contact switch is actuated. The first and the second electrical contact switches could he implemented as part of an electrical stepping switch, said contact switches being switched in succession in the same direction. The first and the second actuating positions should be spaced far enough apart from one another to avoid operating errors.

It would also be conceivable that a second electrical contact switch, which differs from the first contact switch, is actuated in the second actuating position. The second electrical contact switch could generate acoustic feedback, for example, instead of haptic feedback. The second contact switch would have any type of design or could be designed as a contactless contact switch.

According to one embodiment of the device for operating an electrical bicycle component, the neutral position is located between the first actuating position and the second actuating position. Therefore, the actuating element is rotatable by the rider relative to the base element from the neutral position in a first direction of rotation or in an opposite second direction of rotation. The first actuating position is reached when the actuating element is rotated in the first direction of rotation. The second actuating position is reached when the actuating element is rotated in the second, opposite direction of rotation. Operating errors are more likely to occur in the case of actuating positions that are situated next to each other and are assumed in the same direction of rotation. Operating errors are practically ruled out entirely when actuation is carried out in opposite directions of rotation. Due to the preload, the actuating element automatically returns to the neutral position after actuation.

A combination of actuating positions that are located next to one another and are assumed in the same direction, and further actuating positions that are assumed in the opposite direction would also be conceivable. In this way, the rider could switch an electrical stepping switch having two switching stages, i.e., two actuating positions, by rotating the actuating element in the first direction of rotation and, by rotating the actuating element in the opposite direction of rotation. The rider could switch one further electrical contact switch and, therefore, one further actuating position.

According to one embodiment of the device for operating an electrical bicycle component, the first and/or the second electrical contact switch are a snap switch. A snap switch, which is also referred to as a snap-action switch, is advantageous because it not only doses a contact, but also generates haptic feedback. Further components or design measures are not necessary. In addition, force-displacement properties of the snap switch can be adjusted relatively easily, on the one hand in order to permit actuation by the rider using the thumb or index finger and, on the other hand, in order to generate sufficient haptic feedback. The snap switch is compact enough to be comfortably actuated, from an ergonomic perspective, and to take on little installation space in the device for shifting. Alternatively, a snap dome can be utilized as an electrical contact switch.

Electrical contact switches that generate sufficient haptic feedback often simultaneously generate acoustic feedback. For example, a snapping sound is generated when the snap switch snaps over, and this sound is perceived by the driver.

According to one embodiment of the device for operating an electrical bicycle component, the haptic feedback is generated by a snap mechanism of the first and for the second electrical contact switch. Additional components are advantageously avoided due to the snap mechanism integrated in the electrical contact switch. This contributes to a simple design of the device for operating an electrical bicycle component and its assembly.

In order to actuate the contact switch, a continuously increasing switch actuating force must be applied in order to overcome the resistance of the snap mechanism, e.g., a spring force of a spring element in the snap mechanism, and to reach the switching point of the contact switch. Once the switching point has been reached, the snap mechanism abruptly snaps over and closes the contact and, therefore, the current circuit. At the same time, the switch actuating throe drops rapidly. The sudden drop in the switch actuating force generates hawk feedback.

According to one embodiment of the device for operating an electrical bicycle component, the preload of the actuating element into the neutral position is generated by a return spring of the first and/or the second electrical contact switch. Additional components are avoided due to the return spring integrated in the electrical contact switch, which contributes to the simple design and assembly of the device for shifting.

According to one embodiment of the device for operating an electrical bicycle component, the first electrical contact switch and/or the second electrical contact switch are/is located in the base element. The advantage of this embodiment is that the base element and, therefore, the electrical contact switch, are non-rotatably fastened on the handlebar. The electrical contact switches are secured on the handlebar in a stable manner with respect to vibrations that occur during the ride. Inadvertent actuation, which is undesirable, is therefore avoided. No additional centrifugal forces are generated, which could possibly occur in the case of an arrangement in a component that is movable with respect to the bicycle.

The actuating element has transfer surfaces which interact with the electrical contact switches.

The arrangement of the electrical contact switches in the base element allows for a simple replacement of the lower-cost at element. In this way, actuating elements having different ergonomic designs can he available, depending on whether the rider prefers to operate the operating device using the front or back side of the thumb, the front or back side of the index finger, a portion of the palm of the hand, or the space between the thumb and the index. Actuating elements with or without an actuating projection, having a different number of actuating projections, having differently shaped actuating projections, having a different surface design, or made from different materials would be conceivable.

According to one embodiment of the device for operating an electrical bicycle component, the first electrical contact switch and/or the second electrical contact switch are/is located in the actuating element. In this case, the fixed base element has transfer surfaces which interact with the electrical contact switches. For the purpose of actuation, the actuating clement is rotated together with the electrical contact switches relative to the base element and the fixed transfer surfaces from the neutral position to an actuating position.

Alternatively, the electrical contact switches could also be located outside the base element and the actuating element. It merely needs to be ensured that the electrical contact switches and the actuating element are operatively connected, e.g., by means of a transfer projection located on the actuating element, which interacts with the electrical contact switches. An arrangement of the electrical contact switches close to the actuating element is advantageous in this case.

According to one embodiment of the device for operating an electrical component, the actuating element comprises a first actuating projection. The rider can optimally operate the actuating element by means of the actuating projection. An actuating force can be precisely applied to the actuating projection using a finger, preferably the thumb or index finger. The design of the actuating projection can differ in terms of shape, size, and surface condition. An embodiment is advantageous that has a size that approximately corresponds to the size of a fingertip and that feels comfortable to actuate due to its shape. A placement and orientation of the actuating projection that is advantageous from an ergonomic perspective is given when the hand of the rider encompasses the handlebar grip during normal riding and the actuating projections can be easily reached using the thumb and/or index finger. This can differ from rider to rider.

According to one embodiment of the device for operating an electrical bicycle component, the actuating element comprises a second actuating projection. The advantage of this embodiment is that the rider has the option to select between the first and the second actuating projections or to use both actuating projections. For example, the first actuating projection could be situated in such a way that it is easily reached with the thumb. The second actuating projection could be installed in such a way that it is easily reached with the index finger.

It would also be conceivable to design the actuating element with a surface structure, e.g., ribs or nubs, which increases the frictional connection between the hand or the finger and the actuating element. The rider could grip this surface structure either with a finger or with the palm of the hand, or with the space between the thumb and the index linger. One or multiple indentations along the outer surface of the actuating element, into which a fingertip can engage, are also conceivable. The aforementioned surface structures, indentations, and actuating projections can also be used in combination.

An arrangement of the first actuating projection and/or second actuating projection in the lower half of the annular actuating element is advantageous from an ergonomic perspective. In one embodiment, the first and second actuating, projections are situated within a segment of a circle having an angle of approximately 90° or less. This arrangement enables the rider to actuate the operating device using the fingers and, simultaneously, to securely grip the handlebar. In order to do this, it is only necessary to slightly release the index finger and the thumb from the handlebar.

The actuating element rotates from the neutral position to the first actuating position and/or second actuating position, with respect to the base element, by approximately 5° to 40°. An angle of rotation of 5° to 15° is particularly advantageous from an ergonomic perspective.

According to one embodiment of the device for operating an electrical bicycle component, the bicycle component is an electrical gear shifting mechanism. A change in the state of the bicycle component, i.e., the electrical gear shifting mechanism in this case, can be brought about by the operating device fastened on the handlebar. Actuating the operating device prompts the electrical gear shifting mechanism to switch to the next-higher or next-lower gear. The electrical gear shifting mechanism can operate a from derailleur or a front shifting mechanism, i.e., can effectuate the shifting of the chain between adjacent chain rings, or can operate a rear derailleur or a tear shifting mechanism and, therefore, can effectuate the shifting of the chain between adjacent sprockets of a multiple-sprocket arrangement. As is the case with conventional gear shifting mechanisms, an operating device installed on the left side of the handlebar could operate an electrical front derailleur, and a further operating device situated on the right side of the handlebar could operate an electrical rear derailleur.

Modern bicycle drives often comprise only one front chain ring, and therefore a front derailleur is no longer needed. In these cases, one operating device for the rear electrical derailleur is sufficient. One farther operating device could then be used for operating other electrical bicycle components.

According to one embodiment of the operating device for an electrical gear shifting mechanism, a shift into the next-higher gear is carried out in the first actuating position, and a shift into the next-lower gear is carried out in the second actuating position.

It would also be conceivable to program the software of the control system in such a way that holding the operating device for a certain period of time in a first or second actuating position causes multiple gears to be shifted, in succession, in the increasing or decreasing direction. As a result, there is no need to always return to the neutral position when shifting between consecutive gears in the same direction.

Optionally, other bicycle components could also be operated after a predetermined period of time; such a programming of the control system makes it possible to shift multiple or different electrical bicycle components using the same operating device.

The operating device could activate or deactivate an electro-hydraulic or electro-pneumatic shock absorption system, or could operate into different shock absorption stages. The operation of a height-adjustable seat post would also be conceivable. The saddle would be raised or lowered electro-hydraulically, for example. The saddle height could also be steplessly adjusted via actuation of the operating device, by means of a longer actuation. The manner in which the operating of the operating device actually acts on the electrical bicycle component to be operated depends on the programming of the control system.

According to one embodiment, a control system for controlling an electrical bicycle component comprises an operating device of the type described above. The control system further comprises a transmitter unit which is connected to the first electrical contact switch and/or second electrical contact switch. The transmitter unit transmits a control signal to a receiver unit when the device for operating is actuated.

The actuating element is moved to a first actuating position to actuate the operating device. When the electrical contact switch reaches its switching point, the current circuit is closed and an electrical signal is transmitted to the transmitter unit. The electrical contact switch and the transmitter unit are electrically connected to one another, for example via a cable, for this purpose. The transmitter unit comprises a transmitter electronics system. Depending on whether an electrical contact switch is switched, and depending on which electrical contact witch is switched, the transmitter electronics system generates a control signal and transmits said signal to the receiver unit of the bicycle component to be controlled.

The receiver unit is installed close to the bicycle component to be controlled and comprises a receiver electronics system. The receiver unit receives the control signal, evaluates said signal, and controls the bicycle component in accordance with the received signal. The bicycle component to he controlled is a rear derailleur, for example, which is triggered by the receiver unit to shift to a next-higher gear when the corresponding signal has been received. It would also be conceivable that the receiver unit sends a signal back to the transmitter non indicating which gear was selected. A position sensor which detects the gear position can be used for this purpose. Both the transmitter unit as well as the receiver unit could receive, transmit, and process signals in this case.

The receiver electronics system and the transmitter electronics system usually comprise a printed circuit board having a microcontroller. The programming of software of the microcontroller makes it possible to adjust the shift logic depending on the bicycle component to be shifted. Depending on the programmed shift logic, different states can be brought about, such as ON/OFF, shifting the bicycle component is up/down in a stepped manner, or shifting the bicycle component up/down in a stepless manner.

A battery located in the transmitter and receiver unit, or a rechargeable battery, is suitable for supplying power to the electrical units.

According to one embodiment of the control system for controlling an electrical bicycle component, the control signal is wirelessly transmitted from the transmitter unit to the receiver unit. This has the advantage, on the one hand, that it is no longer necessary to lay interfering cables alone the frame or in the frame interior. On the other hand, the operating device can be freely placed on the handlebar. A subsequent adjustment can also be carried out easily in the absence of interfering cables. The conventional signal transmission by means of cables is also possible, of course.

One further problem addressed by the operating device can be considered that of providing a device for operating an electrical bicycle component, which, upon actuation, delivers sufficiently strong haptic feedback to the rider. Specifically on uneven terrain, where the bicycle and the rider are exposed to vibrations anyway, sufficiently strong feedback for the rider is significant. An attempt is made in the prior art to deal with feedback that is too weak by way of additional measures, such as optical or acoustic signals or separate click mechanisms. Such additional devices increase the complexity of the operating device, however, and should be avoided.

This further problem is solved by a device for operating an electrical bicycle component, which comprises a base element designed for installation on bicycle handlebar. The operating device further comprises an actuating element which is disposed on the base element and is disposed so as to be movable with respect to the base element. The actuating element can be moved from a neutral position to a first actuating position. The actuating element is pre-loaded into the neutral position. The operating device further comprises an electrical contact switch. The electrical contact switch generates sensory feedback. The electrical contact switch transmits the sensory feedback to the actuating element when the actuating element is moved from the neutral position to the first actuating position. In one embodiment, the sensory feedback is haptic feedback. Sufficiently strong haptic feedback is generated when a continuously increasing switch actuating three acting on the electrical contact switch reaches a predetermined switching point of the electrical contact switch and then abruptly drops by at least 15%.

The rider applies an actuating force onto the device for operating, which is converted into a switch actuating force acting on the electrical switch. Electrical contact switches differ in terms of their force-displacement properties. Depending on the embodiment of the electrical contact switch that is used, a certain switch actuating force is necessary, and a certain contact travel is passed through in order to reach the predetermined switching point and close the contact.

In one embodiment, the switch actuating force at the predetermined switching point is 8 newton to 14 newton. According to one embodiment, the switch actuating force at the switching point is 12 newton. A switch actuating force of this magnitude is advantageous because, on the one hand, said force can still be easily applied by the rider using one finger and, on the other hand, is great enough to avoid an undesirable operation.

According to one embodiment, the switch actuating force abruptly drops by 15% to 50% after the switching point is overcome. A drop in the switch actuating three by 30% to 50% is particularly advantageous. In one embodiment, the switch actuating force drops by 50%. The abrupt drop in the switch actuating throe after the switching point has been overcome that is of the aforementioned magnitude generates distinct haptic feedback. A drop of at least 12.5% can be perceived by the rider. The greater the percentage drops in the switch actuating force, the more distinct the haptic feedback is.

According, to one embodiment of the device for operating an electronic bicycle component, the switch actuating force drops by 3.5 newton to 7 newton.

According to one embodiment of the device for operating an electrical bicycle component, the electrical contact switch is a snap switch. The embodiment of the electrical contact switch, in particular a snap switch, is significant for solving the problem. The force-displacement characteristic curve of the electrical contact switch, in particular of the snap switch, is decisive for generating sufficient haptic feedback.

In one embodiment of the device for operating an electrical bicycle component, the continuously increasing switch actuating force at the predetermined switching point of the electrical contact switch is 12 newton. The electrical contact switch passes through contact travel of approximately 2 mm before the switching point is reached. Contact travel of 2 mm is reliably achieved by rotating an annular actuating element by approximately 5°. After the switching point has been reached, the switch actuating force abruptly drops from approximately 12 newton to approximately 7 newton, i.e., by at least 40%.

It would also be conceivable to use two electrical contact switches having different force-displacement properties. The switching point of a first electrical contact switch could be reached already at a switch actuating force of 8 newton to 10 newton, and the switching point of a second electrical contact switch could first be reached at 12 newton to 14 newton. The operating device is therefore easier to actuate in the first actuating position than in the second actuating position.

According to one embodiment of the device for operating an electrical bicycle component, the actuating dement is installed so as to be movable relative to the base element. The actuating element performs either a translational movement or a rotary movement when the actuating element is brought from the neutral position to an actuating position. A translational movement is the case, for example, when push-buttons are used that have electrical contact switches installed. Such push-buttons are known from the prior art and will therefore not be discussed in greater detail in the following.

The left/right, upper/lower, and rear/front directional information used in the following relates to a bicycle as viewed in the direction of travel (see FIG. 1). The inner outer directional information relates to the operating device installed on the bicycle handlebar and describes where the elements are located relative to the ends of the bicycle handlebar. The handlebar grip is located closer to the end of the handlebar and, therefore, further outward than the operating device and the brake lever (FIG. 2a). As viewed from the outer side of the handlebar, the operating device is rotated about the handlebar axis A for actuation, either in a first direction of rotation D1 in the counterclockwise direction, or in a second direction of rotation D2 in the clockwise direction.

FIG. 1 shows a bicycle 1 comprising an operating device for operating an electrical bicycle component. The bicycle 1 comprises different bicycle components, such as a height-adjustable seat post 2, a suspension fork 3, a front shining mechanism or front derailleur 4, and a rear shifting mechanism or rear derailleur 5. The operating device for operating an electrical bicycle component is installed on the handlebar 6, specifically on the right end of the handlebar, between the handlebar grip 7 and the brake lever 8. In the embodiment shown, the operating device is intended to wirelessly shift the rear electrical shifting mechanism 5. The remaining components are manually actuated. Other electrical components could also be controlled by means of an operating device, of course, such as, e.g., one further operating device on the left side of the handlebar.

The operating device is suitable not only for a mountain bike, which is shown, but can also be used on a large number of bicycle types, such as racing bicycles, touring bicycles, or e-bikes.

FIG. 2a shows bicycle handlebar 6 comprising the installed operating device. For the purpose of installation, the annular base element (not visible here) is slid onto the handlebar 6 from the end of the handlebar and is fastened thereon. Different types of conventional clamping mechanisms are suitable for fixing the base element which encompasses the handlebar. The base element could also be fastened so as to encompass the handlebar grip 7, or could be designed integral with said handlebar grip. An integral design of the operating device (or the base element) with a brake lever and/or the handlebar grip would also be conceivable. It is important that the base element not rotate with respect to the handlebar 6 or displace along the axis A of said handlebar.

The operating device is positioned, along the handlebar axis A, close to the brake lever 8, and therefore the rider is able to reach both the actuating element 20 having the actuating projection 22 of the operating device, and the brake lever 8. Many riders prefer to leave the index finger on the brake lever 8 during actuation of the operating device. This is possible with the arrangement shown. The palm of the hand and the remaining fingers encompass the handlebar grip 7, while the index finger rests on the brake lever 8 and the thumb rests on the actuating element 20.

A closed annular base element is slid onto the handlebar 6 from the end of the handlebar and is non-rotatably fastened in the correct position and orientation. The part of the base element encompassing the handlebar 6 can be either slotted or closed. In the closed embodiment, the base element is slid on from the end of the handlebar and is secured against rotation on the handlebar 6 by a compression clamp using a clamping screw (see also FIGS. 3, 4, 5, 8). In the slotted, clamp-type embodiment, the base element is either slid on from the end of the handlebar or is folded open n the manner of a clamp and is placed over the handlebar 6. The clamp-type base element is pulled together by an adjusting screw, and therefore the inner diameter of said base element is reduced and is adapted to the diameter of the handlebar.

In all embodiments, the frictional connection prevents the base element from rotating relative to the handlebar. The inner diameter of the annular part of the base element encompassing the handlebar is tailored to the common handlebar diameters in this case. For very small handlebar diameters, an adapter could also be used between the handlebar and the base element.

Figure 2B:
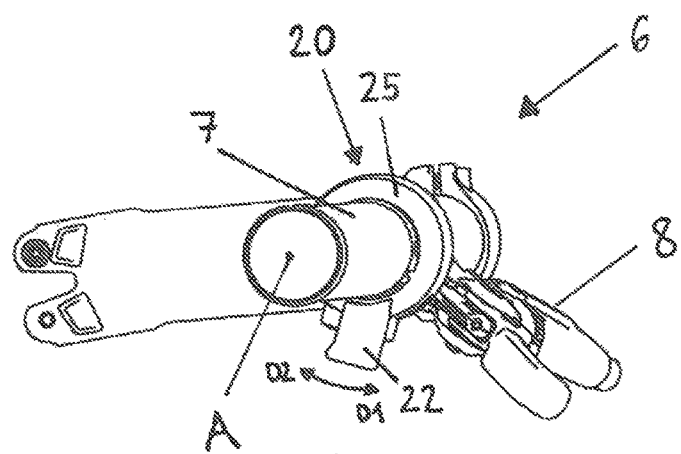

FIG. 2b shows the right end of the handlebar 6 in the side view. Here it is apparent how the operating device encompasses the handlebar 6 with its handlebar axis A. The actuating element 20 with its first actuating projection 22 is mounted so as to be rotatable about an axis of rotation R, which approximately corresponds to the handlebar axis A. The actuating element 20 is pre-loaded into the neutral position and is shown in this position. The actuating element 20 can be rotated with respect to the handlebar 6 or the base element, which is not visible here, from the neutral position, which is shown, through a predetermined angle of rotation in the first direction of rotation D1 to a first actuating position or, in the opposite, second direction of rotation D2 to a second actuating position. For this purpose, the rider either directly grasps the actuating element 20 on its outer surface 25 or presses with one finger against the actuating projection 22. When the actuating element 20 is operated with one finger, e.g. with the thumb or index finger, a small angle of rotation of approximately 5° is ergonomically advantageous, because the rider does not need to move the entire hand, but rather only the finger.

The operating device is oriented and fixed about the handlebar axis A in such a way that the actuating element 20 can be easily reached via its actuating projection 22 using the fingers, on the one hand, and, on the other hand, does not collide with the brake lever 8 during actuation. The actuating projection 22 must have sufficient space in order to be rotated from the neutral position, which is shown, by another at least 5° in the first and second directions of rotation D1, D2, without colliding with the brake lever 8 or other parts, and without pinching the fingers of the rider.

The predetermined angle of rotation depends, inter alia, on the electrical contact switch that is used, and on the contact travel thereof. This will be discussed in greater detail in the following in conjunction with FIGS. 5 and 6.

FIGS. 3a to 3d show different views of the first embodiment of the operating device or operating an electrical bicycle component. The operating device comprises a base element 10 and an actuating element 20 which can he rotated with respect to the base element 10 in the first or the second direction of rotation D1, D2 into a first or a second actuating position. In this case, the actuating element 20 rotates about an axis of rotation R. The axis of rotation R extends either coaxially to or approximately in parallel with the handlebar axis A. A ball bearing 8 is located between the base element 10 and the actuating element 20. The inner portion 11 of the base element 10 encompasses the handlebar in the installed state. The compression clamp 16 is screwed against the handlebar in order to fix the base element 10 on the handlebar. The operating device is shown here in the neutral position. In order to actuate the operating device, the rider applies an actuating force to the actuating element 20 and rotates said element about the axis of rotation by approximately 5° (not shown here). This can take place either by way of finger pressure on the actuating projections 22, 23 or by grasping the outer surface 25 of the actuating element 20. A ribbed structure 24 or any other type of surface structure supports the grasp on the outer surface 25.

The arrangement of the actuating projections 22, 23 along the circumference of the annular actuating element 20 can be best scent in the side view in FIG. 3a. The first and second actuating projections 22, 23 are located in the lower half of the annular actuating element 20. More specifically, in the embodiment shown, the first actuating element 22 is situated at an angular position of approximately 180° to 210°, and the second actuating element 23 is situated at an angular position of approximately 130° to 160° along the circumference of the actuating element 20. The actuating projections 22, 23 lie within a segment of a circle having an angle of approximately 90° or less. This arrangement enables the rider to actuate the operating device using the fingers and, simultaneously, to securely grip the handlebar. In order to do this, it is only necessary to slightly release the index finger and the thumb from the handlebar.

Figure 4A:
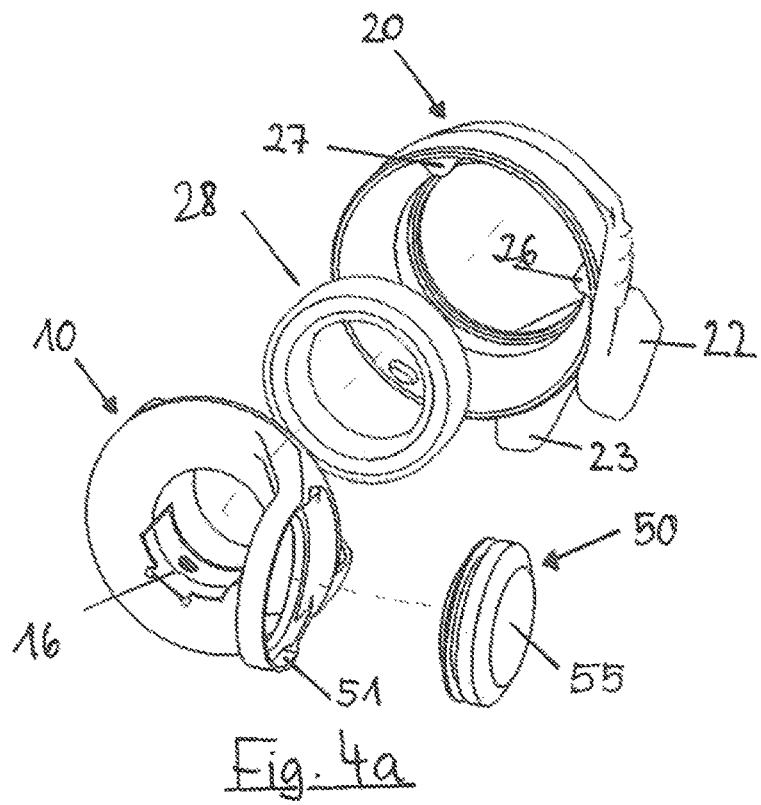
FIG. 4a is an exploded view of the first embodiment.
Figure 4B:
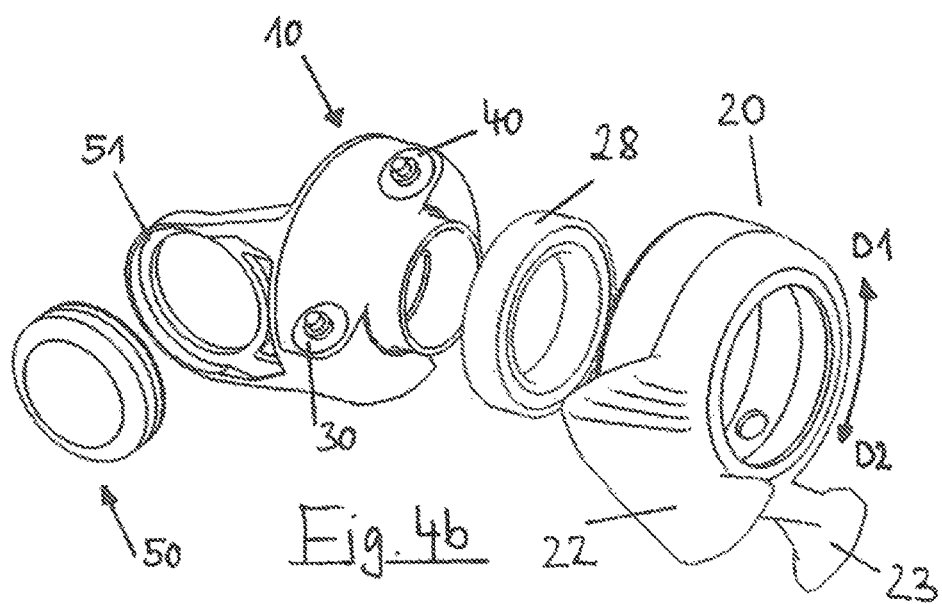

FIGS. 4a and 4b show exploded views of the first embodiment of the operating device from different perspectives. A ball bearing 28 is visible here, which connects the base element 10 and the actuating element 20 in such a way that said base element said actuating element cart rotate relative to one another. In addition, the electrical contact switches 30, 40 located in the base element 10 are apparent; said switches interact with the transfer surfaces 26, 27 of the actuating element 20.

FIGS. 3 and 4 further show a system for controlling an electrical bicycle component comprising the operating device and a transmitter unit 50. The transmitter unit 50 is accommodated in a housing 51 which is integrally formed with the base element 10. The housing 51 is closed by means of a closing cover 55. The electrical contact switches 30, 40 are electrically connected or electrically connectable to the transmitter unit 50. The transmitter unit could also be situated on another part of the operating device. The housing could be designed either integral therewith or separate therefrom. It would also be conceivable to accommodate the transmitter unit in a separate housing close to the operating device, e.g., on the handlebar.

Figure 5:
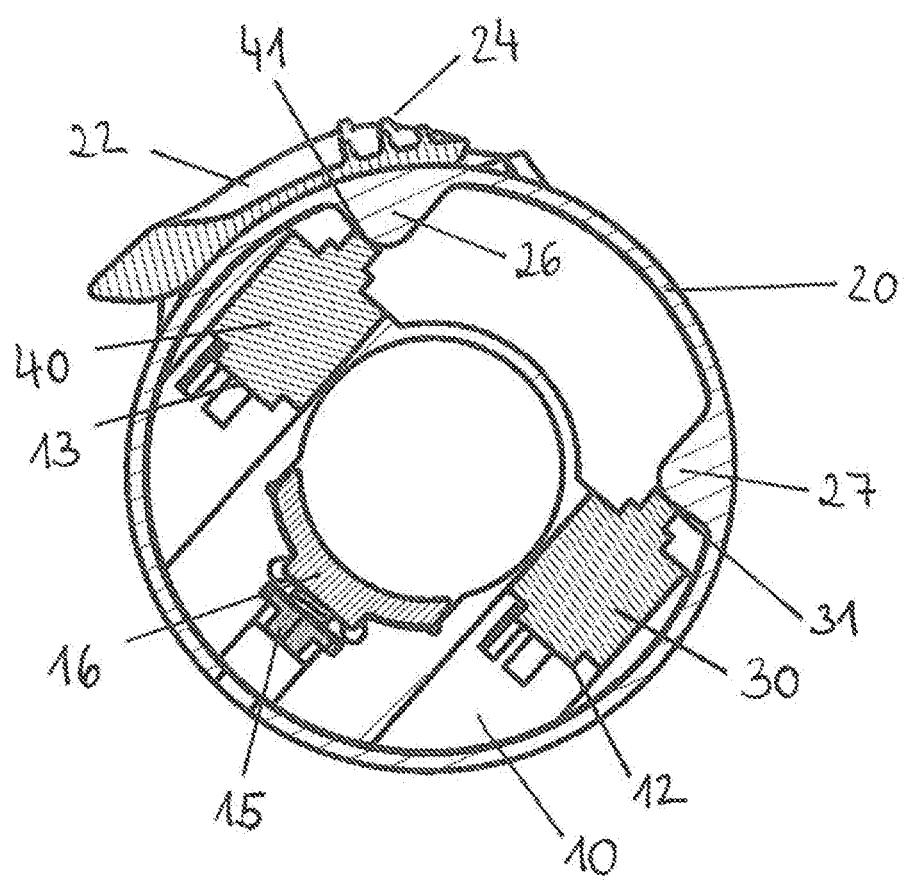
FIG. 5 is a sectional view of the first embodiment.

FIG. 5 shows a sectional view of the first embodiment of the device for operating and illustrates its mode of operation. The base element 10 comprises a first receptacle 12 for the first electrical contact switch 30 and a second receptacle 13 for the second electrical contact switch 40. Any types of electrical contact switches that are suitable for generating sufficient haptic feedback upon actuation can be placed into these receptacles 12, 13.

The rotary movement of the actuating element 20 is converted into a translational movement of the electrical contact switch. For this purpose, the transfer surfaces 26, 27 located on the inner side of the actuating element 20 interact with the switch surfaces 31, 41 of the electrical contact switches 30, 40 assigned thereto, depending on the direction of rotation D1, D2 of the actuating element 20.

The electrical contact switches can either be placed, as separate components, into the receptacles in the base element o can be produced so as to be already integrated with the base element. Separate electrical contact switches have the advantage that said switches can be exchanged at low cost, as necessary. The integrated design has the advantage that the base element simultaneously functions as a contact switch housing.

Figure 6:
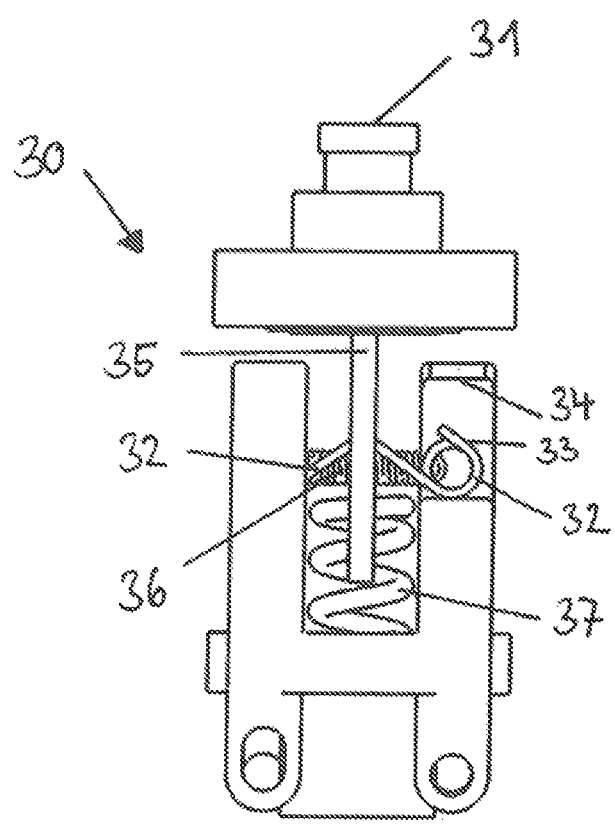
FIG. 6 is a perspective view of an electrical snap switch.

The electrical contact switch 30 shown in FIG. 6 is a snap switch (which is also referred to as a snap action switch). Such snap switches are known from DE 19 59 155 A1, for example, and will therefore not be described in detail. A continuously increasing switch actuating force is applied onto the electrical contact switch in order to overcome the switch resistance. If the switch actuating force is great enough, the switch resistance is overcome, i.e., the so-called switching point is reached. The electrical contact switch passes through contact travel until the switching point is reached. The contact travel depends on the angle of rotation of the actuating element 20. Due to the switch actuating force acting on the switch surface 31 of the electrical contact switch 30, the switch surface 31, together with the plunger 35, is pressed downward. In the embodiment shown, the switch actuating force must overcome both the spring resistance of the spring element 36 of the snap mechanism and that of the return spring 37 before the switching point is reached. If the switching point has been reached, the two contact arms 32 abruptly snap over into the opposite direction, and therefore their contact surfaces 33 strike the fixed contacts 34 (one contact arm 32 is partially covered) and close the contact. The snap-over generates haptic feedback as well as acoustic feedback. An electrical signal is then transmitted from the electrical contact switch 30 to the transmitter unit 50. The plunger 35 of the electrical contact switch then strikes a fixed stop. Such electrical contact switches are also referred to as limit switches, due to their stop. If the actuating force is reduced again, i.e., the pressure on the operating device is reduced, the return spring 37 returns the electrical contact switch 30 to its starting position shown in FIG. 6.

In embodiments of the operating device comprising first and second electrical contact switches 30, 40, the return springs 37, 47 of the electrical contact switches 30, 40 ensure that the contact switches 30, 40 return to their neutral position. Due to the return to the neutral position, a reverse transfer of force takes place from the electrical contact switch 30, 40 to the transfer surfaces 26, 27 of the actuating element 20, which results in the actuating element 20 being pressed into the neutral position and held in said position. Due to the return springs 37, 47, and the transfer surfaces 26, 27 resting against the switch surfaces 31, 41 in the neutral position, no idle travel must be passed through upon actuation of the operating device tree also FIG. 5).

In one embodiment, an increasing switch actuating force of 12 newton must be applied in order to reach the switching point. Below the actuating force, the electrical contact switch passes through contact travel of approximately 2 mm before the switching point is reached and the contact is closed. Contact travel of 2 mm is reliably achieved by rotating the actuating clement 20 by approximately 5°. After the switching point has been reached, the switch, actuating three abruptly drops from approximately 12 newton to approximately 7 newton, i,e., by 40%. This rapid drop generates sufficient haptic feedback. The contact travel is sized in such a way that the size of the electrical contact switch is small enough to fit in the device for operating.

FIG. 7a shows a second embodiment of the device for operating an electrical bicycle component, which is installed on the handlebar 6. Similar to the first embodiment shown in FIGS. 3 to 5, the operating, device comprises a base element 10', which is non-rotatably installed on the handlebar 6, and art actuating element 20 which is rotatable relative thereto.

FIG. 7b shows an exploded view of the second embodiment in FIG. 7a. A ball bearing 28 is optionally located between the two elements 10', 20'. The base element 10' shown is designed in the form of a clamp. The inner portion 11' of the base element 10' encompassing the handlebar 6 is slotted and can be pulled together around the handlebar 6 with the aid of the clamp closure 17 and a screw.

In contrast to the first embodiment, the electrical contact switches 30, 40 are located in the actuating part 20' and not in the base element. This means the actuating element 20' rotates together with the electrical contact switches 30, 40 relative to the base element 10'. Fixed transfer surfaces, which interact with the electrical contact switches 30, 40, stare located on the base element 10'. The transfer surfaces are not shown in FIG. 7b, for the sake of simplicity (see FIG. 8b).

One further difference from the first embodiment is that the actuating element 20' comprises actuating projections 22, 23 which are designed as a separate part 29'. The separate part 29 is the exchangeable. The separate part 29' is non-rotatably connectable to the actuating element 20'. The rider can select from a number of different separate parts according to his wishes, which are then installed on the actuating element 20'. The separate parts can differ in terms of their material, their surface conditions and/or ergonomics. For example, said parts could comprise no actuating projections, or one, two, or three actuating projections. The actuating projections could be positioned and oriented at different positions along the circumference of the annular separate part. The actuating projections could also have a surface structure and could differ in terms of their size.

FIGS. 7a and 7b further show a control system for controlling an electrical bicycle component, which comprises the operating device and the transmitter unit 50. The transmitter unit 50 comprises the transmitter electronics system 52 and a battery 54. The transmitter unit 50 is accommodated in a housing 51' which is integral with the actuating element 20' and is closed by a closing cover 55. The electrical contact switches 30, 40 are electrically connected to the transmitter unit 50.

FIG. 8a shows a third embodiment of the operating device for operating an electrical bicycle component, which is installed on the handlebar 6. Similar to the first embodiment shown in FIGS. 3 to 5, the operating device comprises a base element 10", which is non-rotatably installed on the handlebar 6, and an actuating element 20" which is rotambic relative thereto.

FIG. 8b shows an exploded view of the second embodiment in FIG. 7a. A ball bearing 28 is located between the two elements 10", 20", which facilitates the relative movement. The base element 10" is non-rotatably fixed on the handlebar 6 by means of a compression clamp 16 and a clamping screw 15. The actuating element 20" comprises an actuating projection 22".

In contrast the first embodiment, the actuating projection 22" is designed as a separate part 29" and is therefore exchangeable. Actuating projections having different shapes can be fastened on the actuating element 20". The actuating projection 22" further permits an orientation along its longitudinal axis. For this purpose, the inner toothing of the actuating projection 22" interacts with the outer toothing of the housing 51". The actuating projection 22" is first oriented about its longitudinal axis and is then connected to the actuating element 20". In this way, the actuating projection 22" can be adapted to the ergonomics of the rider.

In contrast to the first embodiment, the actuating element 20" comprises the electrical contact switches 30, 40, and fixed base element 10" comprises the transfer surfaces 26", 27". This means the electrical contact switches 30, 40 rotate together with the actuating element 20" relative to the base element 10" and interact with the fixed transfer surfaces 26", 27".

FIGS. 8a and 8b further show a control system for controlling an electrical bicycle component, which comprises the operate device and a transmitter unit 50". The transmitter unit 50" comprises the transmitter electronics system 52 and a battery 54. The transmitter unit 50" is accommodated in a housing 51" which is integrally formed with the actuation element 20". The housing 51" is closed with a closing cover 55" and is scaled with a sealing ring 56. The electrical contact switches 30, 40 are electrically connected to the transmitter unit 50".

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An operating device for a control system for controlling an electrical bicycle component, the operating device comprising:
   an annular base element configured to be non-rotatably mounted about a bicycle handlebar;
   an annular actuating element rotatable relative to the annular base element from a neutral position to a first actuating position, wherein the annular actuating element is pre-loaded into the neutral position; and
   a first electrical contact switch actuated when the annular actuating element is moved from the neutral position to the first actuating position, wherein the first electrical contact switch, upon actuation, generates a first sensory feedback and transfers the first sensory feedback to the annular actuating element.

2. The operating device of claim 1, wherein the first sensory feedback is haptic feedback.

3. The operating device of claim 1, wherein the annular actuating element is rotatable from the neutral position to a second actuating position, and the device further comprises a second electrical contact switch which is actuated when the annular actuating element is moved from the neutral position to the second actuating position, and the second contact switch, upon actuation, generates a second sensory feedback and transfers the second sensory feedback to the annular actuating element.

4. The operating device of claim 3, wherein the second sensory feedback is haptic feedback.

5. The operating device of claim 3, wherein the neutral position is located between the first actuating position and the second actuating position.

6. The operating device of claim 3, wherein one of the first and the second electrical contact switches is a snap switch.

7. The operating device of claim 3, wherein the first and second electrical contact switches are snap switches.

8. The operating device of claim 3, wherein haptic feedback is generated by a snap mechanism of the first and/or the second electrical contact switch.

9. The operating device of claim 3, wherein the preload of the annular actuating element into the neutral position is generated by a return spring of the first and/or the second electrical contact switch.

10. The operating device of claim 3, wherein one of the first and the second electrical contact switches is located in the annular base element.

11. The operating device of claim 3, wherein the first and second electrical contact switches are located in the annular base element.

12. The operating device of claim 3, wherein one of the first and the second electrical contact switches is located in the annular actuating element.

13. The operating device of claim 3, wherein the first and second electrical contact switches are located in the annular actuating element.

14. The operating device of claim 1, wherein the annular actuating element comprises a first actuating projection.

15. The operating device of claim 14, wherein the annular actuating element comprises a second actuating projection.

16. The operating device of claim 1, wherein the bicycle component is an electrical gear shifting mechanism.

17. A control system for controlling an electrical bicycle component, the control system comprising:
an operating device comprising:
an annular base element configured to be non-rotatably mounted about a bicycle handlebar,
an annular actuating element rotatable relative to the annular base element from a neutral position to a first actuating position, wherein the annular actuating element is pre-loaded into the neutral position, and
a first electrical contact switch actuated when the annular actuating element is moved from the neutral position to the first actuating position, wherein the first electrical contact switch, upon actuation, generates a first sensory feedback and transfers the first sensory feedback to the annular actuating element; and
a transmitter unit connected to the first electrical contact switch and configured to transmit a control signal when the operating device is actuated.

18. The control system of claim 17, wherein the control signal is wirelessly transmitted from the transmitter unit.

19. The control system of claim 17, wherein the annular actuating element is rotatable from the neutral position to a second actuating position, wherein the annular actuating element is pre-loaded into the neutral position, and further comprising a second electrical contact switch which is actuated when the annular actuating element is moved from the neutral position to the second actuating position, and the second contact switch, upon actuation, generates a second sensory feedback and transfers the second sensory feedback to the annular actuating element, wherein the transmitter unit is connected to the second electrical contact switch.

20. The control system of claim 19, wherein the second sensory feedback is haptic feedback.

\* \* \* \* \*